United States Patent
Burkhardt et al.

(10) Patent No.: US 10,668,946 B2
(45) Date of Patent: Jun. 2, 2020

(54) PLAUSIBILITY CHECKING OF FIELD-ORIENTED CONTROL

(71) Applicant: Robert Bosch Automotive Steering GmbH, Schwäbisch Gmünd (DE)

(72) Inventors: Thomas Burkhardt, Zimmerbach (DE); Malte Elzmann, Burgstetten (DE)

(73) Assignee: Robert Bosch Automotive Steering GmbH, Schwäbisch Gmünd (DE)

( * ) Notice: Subject to any disclaimer, the term of this patent is extended or adjusted under 35 U.S.C. 154(b) by 211 days.

(21) Appl. No.: 15/748,213

(22) PCT Filed: Jul. 21, 2016

(86) PCT No.: PCT/EP2016/067428
§ 371 (c)(1),
(2) Date: Jan. 29, 2018

(87) PCT Pub. No.: WO2017/016979
PCT Pub. Date: Feb. 2, 2017

(65) Prior Publication Data
US 2018/0215410 A1    Aug. 2, 2018

(30) Foreign Application Priority Data
Jul. 30, 2015 (DE) ........................ 10 2015 112 469

(51) Int. Cl.
*B62D 5/04* (2006.01)

(52) U.S. Cl.
CPC ......... *B62D 5/0484* (2013.01); *B62D 5/0487* (2013.01)

(58) Field of Classification Search
CPC .......................... B62D 5/0484; B62D 5/0487
See application file for complete search history.

(56) References Cited

U.S. PATENT DOCUMENTS

| 2008/0176711 A1* | 7/2008 | Moehlmann | F16H 61/12 |
| | | | 477/166 |
| 2009/0079373 A1* | 3/2009 | Nagase | H02P 6/28 |
| | | | 318/400.22 |
| 2012/0128113 A1* | 5/2012 | Park | G21C 19/19 |
| | | | 376/264 |

FOREIGN PATENT DOCUMENTS

| EP | 0 901 217 A1 | 3/1999 |
| EP | 2 043 253 A2 | 4/2009 |

OTHER PUBLICATIONS

International Search Report corresponding to PCT Application No. PCT/EP2016/067428, dated Sep. 28, 2016 (German and English language document) (5 pages).

* cited by examiner

*Primary Examiner* — Kira Nguyen
(74) *Attorney, Agent, or Firm* — Maginot, Moore & Beck LLP

(57) ABSTRACT

The description relates to a method for controlling a servo drive of a steering system of a vehicle, comprising the step of: failure of the feedback comprising the step of: monitoring the control of the servo drive.

7 Claims, 2 Drawing Sheets

PLAUSIBILITY CHECKING OF FIELD-ORIENTED CONTROL

This application is a 35 U.S.C. § 371 National Stage Application of PCT/EP2016/067428, filed on Jul. 21, 2016, which claims the benefit of priority to Serial No. DE 10 2015 112 469.6, filed on Jul. 30, 2015 in Germany, the disclosures of which are incorporated herein by reference in their entirety.

The present disclosure concerns a method for the control of a servo drive of a steering system of a vehicle and a steering system of a vehicle.

BACKGROUND

Field-oriented control for synchronous machines is known in the prior art. Field-oriented control is based on two measured phase currents and a measured rotor angular position of the synchronous machine. Control is characterized by feedback.

Field-oriented control is only usual in simple and non-critical applications. With field-oriented control, no measurements are carried out or only the angle or the currents are measured. The control has no or only limited feedback.

SUMMARY

A servo drive of a steering system is operated by a control system. In this case, different signals are used for feedback. In the case of a fault, the feedback can be interrupted and control of the servo drive is no longer possible. The steering system no longer obtains all the fed back signals that are required for control. In this case, the servo drive can only be operated by a controller. According to the disclosure, the servo drive should be kept operating for as long as possible in the case of a fault leading to the failure of control, whereby the servo drive can only be driven in the control mode. However, in this case the occurrence of a safety-critical situation is to be prevented. For this purpose, monitoring of the control of the servo drive is necessary, so that the servo drive can be turned off on the occurrence of a fault.

It is therefore an object to perform monitoring of the control of a synchronous machine, so that a permanent control mode is enabled without the occurrence of a safety-critical situation.

As a first embodiment of the disclosure, a method for the control of a servo drive of a steering system of a vehicle is provided, comprising the step: failure of the feedback, comprising the step: monitoring the controller of the servo drive.

If the control of the servo drive fails because feedback variables are no longer available or not all feedback variables are now available, according to the disclosure the servo drive can continue to be operated without feedback in a control mode. This enables the necessary minimum power for the usual driving maneuvers, possibly even the undiminished power of the servo drive for power steering, to be available. According to the disclosure, control can therefore be provided not just for a brief period of time (less than 60 seconds) or in an emergency mode. Instead of this, a permanent control mode of the servo drive should be enabled.

As a second embodiment of the disclosure, a steering system of a vehicle is provided, wherein the steering system is suitable for the use of the method disclosed herein.

Further examples of embodiments are described herein.

According to an example of an embodiment of the disclosure, a method is provided, wherein monitoring of the control of the servo drive is carried out continuously or periodically.

Owing to the lack of feedback, the possibility of monitoring the servo drive is lost. It must be ensured that no fault with a servo drive occurs in a control mode in order to be able to exclude a safety-critical situation. According to the disclosure, monitoring of the servo drive is carried out continuously or periodically, at least at small intervals.

In a further embodiment according to the disclosure, a method is provided, wherein only a phase current of the servo drive is measured.

Feedback is in particular no longer possible if two phase currents of the servo drive can no longer be measured, but only one phase current can still be measured.

According to a further example of an embodiment of the present disclosure, a method is provided comprising the step: turning off the servo drive if a fault is detected during monitoring of the control of the servo drive.

According to the disclosure, the servo drive must be monitored. If a fault occurs, it is necessary to turn off the servo drive in order to avoid safety-critical situations.

According to an example of an embodiment of the disclosure, a method is provided comprising the steps: measurement of a first phase current of the servo drive, calculation of a second phase current of the servo drive, determining the rotor angular position of the servo drive and monitoring the servo drive based on the first and second phase currents and the rotor angular position.

By using a calculation of the second phase current, all values (first and second phase currents and rotor angular position) can be made available in order to perform control of the servo drive.

In a further embodiment according to the disclosure, a method is provided comprising the step: calculation of an actual state of the servo drive based on the measured first phase current, the calculated second phase current and the rotor angular position.

According to a further exemplary embodiment of the present disclosure, a method is provided comprising the step: comparing the actual state with the target state of the servo drive.

According to an example of an embodiment of the disclosure, a method is provided, wherein the servo drive is a synchronous machine.

As an idea of the disclosure, consideration can be given to providing monitoring of the control of a synchronous machine following the failure of the control system. This enables temporally longer operation of the synchronous machine in a control mode, because on the occurrence of a fault this can be detected and the synchronous machine can be turned off. The occurrence of a safety-critical situation can be avoided by this. The synchronous machine is used as a servo drive for a steering system of a vehicle.

The individual features can of course also be combined with each other, whereby in part effects can also advantageously be set up that extend beyond the sum of the individual effects.

BRIEF DESCRIPTION OF THE DRAWINGS

Further details and advantages of the disclosure are made clear using the exemplary embodiments represented in the drawings. In the figures

DETAILED DESCRIPTION

Figure 1:
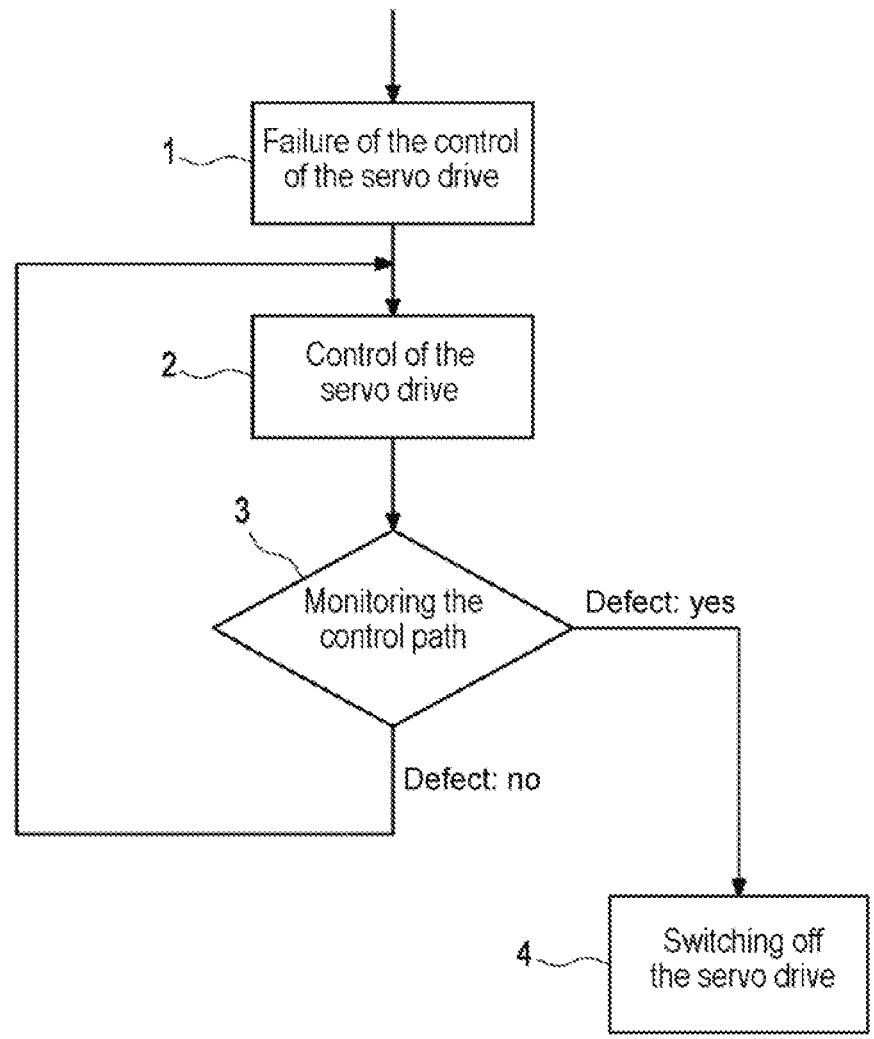
FIG. 1 shows a flow chart of a method according to the disclosure with monitoring of the control path of a synchronous machine and FIG. 2 shows a flow chart of a further method according to the disclosure.

FIG. 1 shows a method according to the disclosure, with which an affected synchronous machine is operated in a control mode 2, i.e. without feedback, following failure of the feedback 1. So that temporally longer operation in the control mode is enabled, according to the disclosure monitoring of the control of the synchronous machine 3 is carried out. If a fault occurs, the synchronous machine is switched off 4. The occurrence of a safety-critical situation can be avoided by this.

Figure 2:
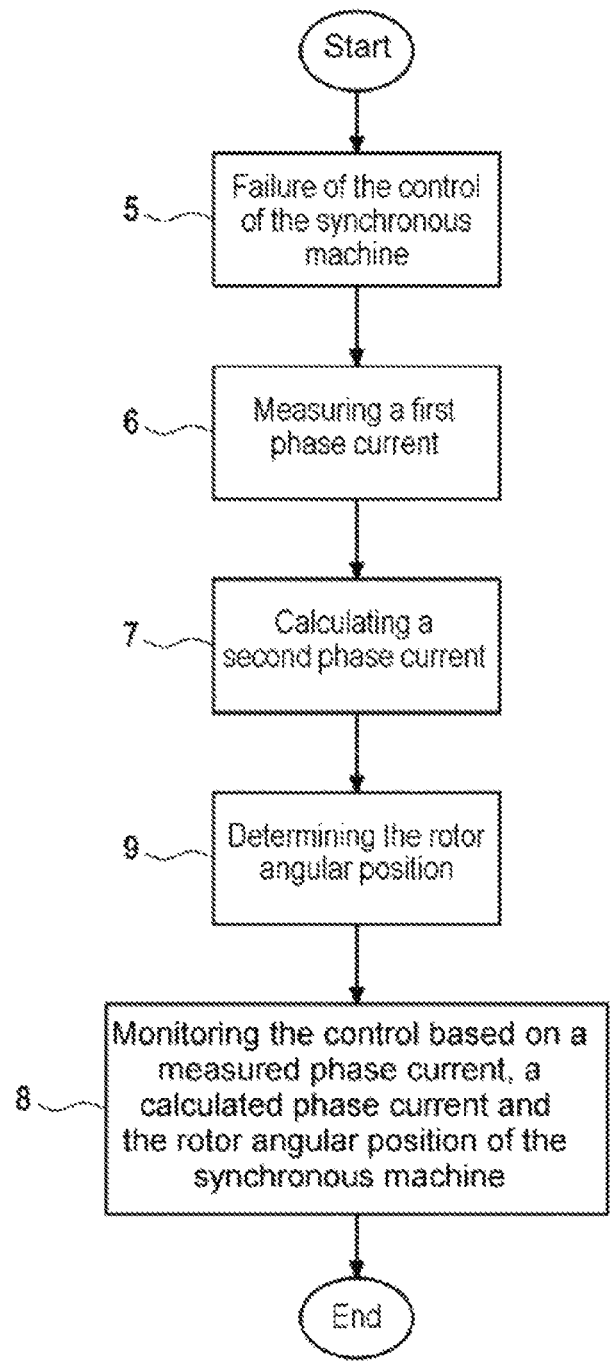

FIG. 2 shows an alternative method according to the disclosure with which control of the synchronous machine for power steering is carried out following failure of the control system 5. For control of the synchronous machine, a first phase current is measured 6 and a second phase current is calculated 7. Moreover, the rotor angular position of the synchronous machine is determined 9. Based on said values, the first and second phase currents and the rotor angular position, monitoring of the control of the synchronous machine can be carried out 8. A fault can be detected as a result and if necessary the synchronous machine is switched off, whereby a safety-critical situation can be prevented. The measured phase current and the calculated phase current do not influence the control path of the synchronous machine.

For said reason, plausibility checking of the control path by means of said phase currents is possible.

It should be noted that the term "comprise" does not exclude further elements or steps of the method, likewise the terms "a" and "one" do not exclude a plurality of elements and steps.

The reference characters that are used are only used to increase comprehensibility and should never be considered as restrictive, wherein the protective scope of the disclosure is represented by the claims.

LIST OF THE REFERENCE CHARACTERS 1 failure of the control of the servo drive
2 control of the servo drive
3 monitoring the control path
4 turning off the servo drive
5 failure of the control of the synchronous machine
6 measurement of a first phase current
7 calculation of a second phase current
8 monitoring the control based on: a measured phase current, a calculated phase current and the rotor angular position of the synchronous machine
9 Determining the rotor angular position

The invention claimed is:

1. A method for controlling a servo drive of a steering system of a vehicle, the method comprising:
    operating the servo drive using feedback control based on feedback signals;
    continuing to operate the servo drive using feedback-less control in response to a failure of the at least one of the feedback signals; and
    during the continued operation of the servo drive using the feedback-less control:
        measuring a first phase current of the servo drive;
        calculating a second phase current of the servo drive;
        determining a rotor angular position of the servo drive;
        monitoring the continued operation of the servo drive using the feedback-less control, based on the measured first phase current, the calculated second phase current, and the determined rotor angular position, to detect a fault; and
        turning off the servo drive in response to detecting the fault,
    wherein the measured first phase current and the calculated second phase current do not influence the continued operation of the servo drive using the feedback-less control.

2. The method as claimed in claim 1, the monitoring further comprising:
    monitoring the continued operation of the servo drive using the feedback-less control one of continuously and periodically.

3. The method as claimed in claim 1 further comprising:
    measuring only one phase current of the servo drive.

4. The method as claimed in claim 1 further comprising:
    calculating an actual state of the servo drive based on the measured first phase current, the calculated second phase current, and the determined rotor angular position.

5. The method as claimed in claim 4 further comprising:
    comparing the actual state with a target state of the servo drive.

6. The method as claimed in claim 1, wherein the servo drive is a synchronous machine.

7. A steering system of a vehicle, the steering system comprising:
    a servo drive; and
    a control system configured to:
        operate the servo drive using feedback control based on feedback signals;
        continue to operate the servo drive using feedback-less control in response to a failure of the at least one of the feedback signals;
        during the continued operation of the servo drive using the feedback-less control:
            measure a first phase current of the servo drive;
            calculate a second phase current of the servo drive;
            determine a rotor angular position of the servo drive;
            monitor the continued operation of the servo drive using the feedback-less control, based on the measured first phase current, the calculated second phase current, and the determined rotor angular position, to detect a fault; and
            turn off the servo drive in response to detecting the fault,
        wherein the measured first phase current and the calculated second phase current do not influence the continued operation of the servo drive using the feedback-less control.

* * * * *